(12) United States Patent
Itsuki (10) Patent No.: US 11,547,536 B2
(45) Date of Patent: Jan. 10, 2023

(54) BASE MEMBER FOR ORTHODONTIC IMPLANT DEVICE

(71) Applicants: Yasuhiro Itsuki, Tokyo (JP); OKADA MEDICAL SUPPLY CO., LTD., Tokyo (JP)

(72) Inventor: Yasuhiro Itsuki, Tokyo (JP)

(73) Assignees: Yasuhiro Itsuki, Tokyo (JP); OKADA MEDICAL SUPPLY CO., LTD., Tokyo (JP)

( * ) Notice: Subject to any disclaimer, the term of this patent is extended or adjusted under 35 U.S.C. 154(b) by 813 days.

(21) Appl. No.: 16/478,856

(22) PCT Filed: Jan. 18, 2018

(86) PCT No.: PCT/JP2018/001348
§ 371 (c)(1),
(2) Date: Jul. 18, 2019

(87) PCT Pub. No.: WO2018/135567
PCT Pub. Date: Jul. 26, 2018

(65) Prior Publication Data
US 2019/0374315 A1    Dec. 12, 2019

(30) Foreign Application Priority Data
Jan. 19, 2017    (JP) .............................. JP2017-007403

(51) Int. Cl.
*A61C 8/00* (2006.01)
*A61C 7/02* (2006.01)
*A61C 7/12* (2006.01)

(52) U.S. Cl.
CPC .............. *A61C 8/0096* (2013.01); *A61C 7/02* (2013.01); *A61C 7/12* (2013.01); *A61C 8/0068* (2013.01)

(58) Field of Classification Search
CPC ....... A61C 8/0096; A61C 8/0062; A61C 7/02; A61C 7/12
See application file for complete search history.

(56) References Cited

U.S. PATENT DOCUMENTS 5,052,930 A * 10/1991 Lodde .................. A61C 8/0031
433/176
6,354,834 B2 * 3/2002 Kanomi .................... A61C 7/00
433/18

(Continued)

FOREIGN PATENT DOCUMENTS

| CN | 101641055 | 2/2010 |
| CN | 204379459 | 6/2015 |

(Continued)

OTHER PUBLICATIONS

"Office Action of Japan Counterpart Application", dated Jan. 14, 2020, with English translation thereof, p. 1-p. 12.

(Continued)

*Primary Examiner* — Nicholas D Lucchesi
(74) *Attorney, Agent, or Firm* — JCIPRNET (57) ABSTRACT

A base member for an orthodontic implant device. The base member makes it possible to easily and reliably attach a correction implement. The base member is secured by a plurality of screws that are embedded in a bone inside an oral cavity. Each of the plurality of screws has a screw part that is embedded in the bone and a polygonal-columnar head part that is exposed inside the oral cavity. The base member has at least three engagement holes that are provided so as to be capable of engaging the polygonal-columnar head parts and such that the centers thereof are not on the same straight line.

7 Claims, 5 Drawing Sheets

(56) References Cited

U.S. PATENT DOCUMENTS

| | | | |
|---|---|---|---|
| 7,258,545 B2* | 8/2007 | Hotta | A61C 7/00 433/176 |
| 8,251,698 B2* | 8/2012 | De Clerck | A61C 7/00 433/18 |
| 8,551,143 B2* | 10/2013 | Norris | A61B 17/842 606/280 |
| 8,764,441 B2* | 7/2014 | Polley | A61B 17/666 606/86 R |
| 9,072,568 B2* | 7/2015 | Kook | A61C 7/18 |
| 10,010,347 B2* | 7/2018 | Marcus | A61B 17/6433 |
| 2001/0005575 A1 | 6/2001 | Kanomi et al. | |
| 2002/0150856 A1 | 10/2002 | Payton | |
| 2010/0112506 A1 | 5/2010 | Itsuki et al. | |

FOREIGN PATENT DOCUMENTS

| | | |
|---|---|---|
| CN | 205359669 | 7/2016 |
| EP | 2123234 | 11/2009 |
| IT | VI20090084 | 10/2010 |
| JP | H10507387 | 7/1998 |
| JP | 2001187071 | 7/2001 |
| JP | 2004097787 | 4/2004 |
| JP | 2004136134 | 5/2004 |
| JP | 2004174278 | 6/2004 |
| JP | 2006314419 | 11/2006 |
| JP | 2008183016 | 8/2008 |
| JP | 2009513228 | 4/2009 |
| JP | 2011519299 | 7/2011 |
| KR | 101534622 | 7/2015 |
| WO | 2012099439 | 7/2012 |

OTHER PUBLICATIONS

"Office Action of China Counterpart Application", dated Dec. 2, 2020, with English translation thereof, p. 1-p. 12.

"Office Action of Korea Counterpart Application", dated Jan. 6, 2021, with English translation thereof, p. 1-p. 13.

"Office Action of Singapore Counterpart Application", dated Oct. 20, 2020, p. 1-p. 7.

"Office Action of Europe Counterpart Application", dated Jun. 1, 2021, p. 1-p. 5.

"Search Report of Europe Counterpart Application", dated Sep. 1, 2020, p. 1-p. 7.

"Office Action of Canada Counterpart Application", dated Aug. 28, 2020, pp. 1-3.

"Written Opinion of The International Searching Authority (Form PCT/ISA/237) of PCT/JP2018/001348", with English translation thereof, dated Apr. 3, 2018, pp. 1-10.

"International Search Report (Form PCT/ISA/210)" of PCT/JP2018/001348, dated Apr. 3, 2018, with English translation thereof, pp. 1-4.

Office Action of Japan Counterpart Application, with English translation thereof, dated Jun. 2, 2020, pp. 1-6.

Office Action of Vietnam Counterpart Application, with English translation thereof, dated May 24, 2022, pp. 1-4.

* cited by examiner

BASE MEMBER FOR ORTHODONTIC IMPLANT DEVICE

CROSS-REFERENCE TO RELATED APPLICATION

This application is a 371 application of the international PCT application serial no. PCT/JP2018/001348, filed on Jan. 18, 2018, which claims the priority benefit of Japan application no. 2017-007403, filed on Jan. 19, 2017. The entirety of each of the above-mentioned patent applications is hereby incorporated by reference herein and made a part of this specification.

TECHNICAL FIELD

The present invention relates to a base member used for an orthodontic implant device.

BACKGROUND ART

In orthodontics, teeth alignment is adjusted by applying a three-dimensional correction force such as a forward/backward and leftward/rightward force, inclination, and rotation to a tooth to be moved. In order to apply a correction force to teeth, brackets are secured to teeth, a wire or the like is attached between a bracket of a reference tooth and a bracket of the tooth to be moved, and the wire is gradually fastened. The correction force is applied in a desired direction by adjusting routing of the wire, how the wire is fastened, and the like.

According to an orthodontic implant device, a screw or an anchor is embedded in a bone in an oral cavity, and a correction force is applied to a desired tooth using the screw or the like as a securing end. A plate, a wire, or the like is secured to the embedded screw or the like, and a correction force is applied to the tooth via the plate, the wire, or the like (see Patent Literatures 1 to 6, for example). Also, a configuration is disclosed in which a securing part is secured as an orthodontic support element to a jawbone and an exposed part is exposed inside an oral cavity (see Patent Literatures 7 and 8, for example).

CITATION LIST

Patent Literature

[Patent Literature 1]
Japanese National Publication of International Patent Application No. 2011-519299
[Patent Literature 2]
Japanese National Publication of International Patent Application No. 2009-513228
[Patent Literature 3]
Japanese Unexamined Patent Application Publication No. 2006-314419
[Patent Literature 4]
Japanese Unexamined Patent Application Publication No. 2004-97787
[Patent Literature 5]
Japanese Unexamined Patent Application Publication No. 2001-187071
[Patent Literature 6]
Japanese National Publication of International Patent Application No. 10-507387
[Patent Literature 7]
Japanese Unexamined Patent Application Publication No. 2004-174278
[Patent Literature 8]
Japanese Unexamined Patent Application Publication No. 2004-136134

SUMMARY OF INVENTION

Technical Problem

In attachment of a correction implement, a considerable burden is imparted on a patient. Also, reduction in an operation burden on a doctor who conducts medical treatment leads to reduction in a medical treatment time and accurate and stable treatment. In this manner, not only a burden on the doctor but also a burden on the patient are reduced. Since an implant device in orthodontics in particular requires a treatment for embedding a screw or the like in a bone in an oral cavity, it requires reduction in a burden and high reliability. In particular, it is important to prevent the embedded screw from loosening, and skills for accurately attaching a tool such as a wire in accordance with the shape in the oral cavity and the state of teeth, which are different for each patient, are also essential.

An object of the invention is to provide a base material for an orthodontic implant device that makes it possible to easily and reliably attach a correction implement.

Solution to Problem

According to an aspect of the invention, there is provided a base member that is used for an orthodontic implant device and is secured to a plurality of screws embedded in a bone in an oral cavity. Each of the plurality of screws has a screw part that is embedded in the bone and a polygonal-columnar head part that is exposed inside the oral cavity. The base member has at least three engagement holes that are provided so as to be capable of engaging the polygonal-columnar head parts. Relative positions of at least three engagement holes are set in an arrangement such that three of the screws that are inserted into and secured to at least three engagement holes are not aligned in the same straight line in a top view.

With such a configuration, the engagement between at least three engagement holes and the screws makes it possible to stably secure the base member to the inside of the oral cavity through three-point support. Since the engagement between the polygonal-columnar head parts of the screws and the engagement holes prevents the screws from rotating at this time, it is possible to fasten the bolts to the polygonal-columnar head parts without any need to maintain pressing on the screws.

In the aforementioned base members, the plurality of screws may have first, second, and third screws, and the base member may have a first base part, a second base part, and a third base part. The first base part has a first engagement hole that is provided so as to be capable of engaging the polygonal-columnar head part of the first screw. The second base part has a second engagement hole that is provided so as to be capable of engaging the polygonal-columnar head part of the second screw. The third base part has a third engagement hole that is not aligned on a straight line connecting a center of the first engagement hole and a center of the second engagement hole and is provided so as to be capable of engaging the polygonal-columnar head part of the third screw.

With such a configuration, the engagement between each of the first, second, and third engagement holes and each of the first, second, and third screws makes it possible to stably secure the base member to the inside of the oral cavity through three-point support.

The aforementioned base member may further include: a coupling part with flexibility that is provided between at least either the first base and the second part or the first base part and the third base part. In this manner, it becomes easier to adjust the positional relationships between both the base parts connected with the coupling part. That is, it is possible to fit the position and the angle of the base member along the complicated shape inside the oral cavity, to secure the base member, and then to fixedly secure the base member in close contact with the inside of the oral cavity.

In the aforementioned base member, the coupling part may have a first arm part that extends in a first direction and a second arm part that is connected to the first arm part and extends in a second direction that is different from the first direction. In this manner, it is possible to easily cause deformation around an axis in a direction in which each arm part of the coupling part extends in a direction that perpendicularly intersects the axis.

In the base member, the coupling part may further have a third arm part that is connected to the second arm part and extends on a side on which the first arm part is connected to the second arm part. In this manner, it is possible to cause deformation with reference to more axes with the three arm parts, namely the first to third arm parts, than that caused in a case of two arm parts.

In the aforementioned base member, at least one of the first, second, and third engagement holes may be a long hole. With the long hole, it is possible to absorb positional deviation of the screws in the direction and the range of the long hole and to reliably attach the base member.

The aforementioned base member may further include a securing part that is connected to at least any one of the first, second, and third base parts and detachably secures an auxiliary tool. In this manner, it is possible to replace only the auxiliary tool while keeping the base member attached.

Advantageous Effects of Invention

According to the invention, it is possible to provide a base member in an orthodontic implant device that makes it possible to easily and reliably attach a correction implement.

DESCRIPTION OF EMBODIMENTS

Hereinafter, embodiments of the invention will be described with reference to drawings. Note that the same reference numerals will be applied to the same members in the following description, and description of members that are described once will appropriately be omitted.

Configurations of Implant Device and Base Member

Figure 1:
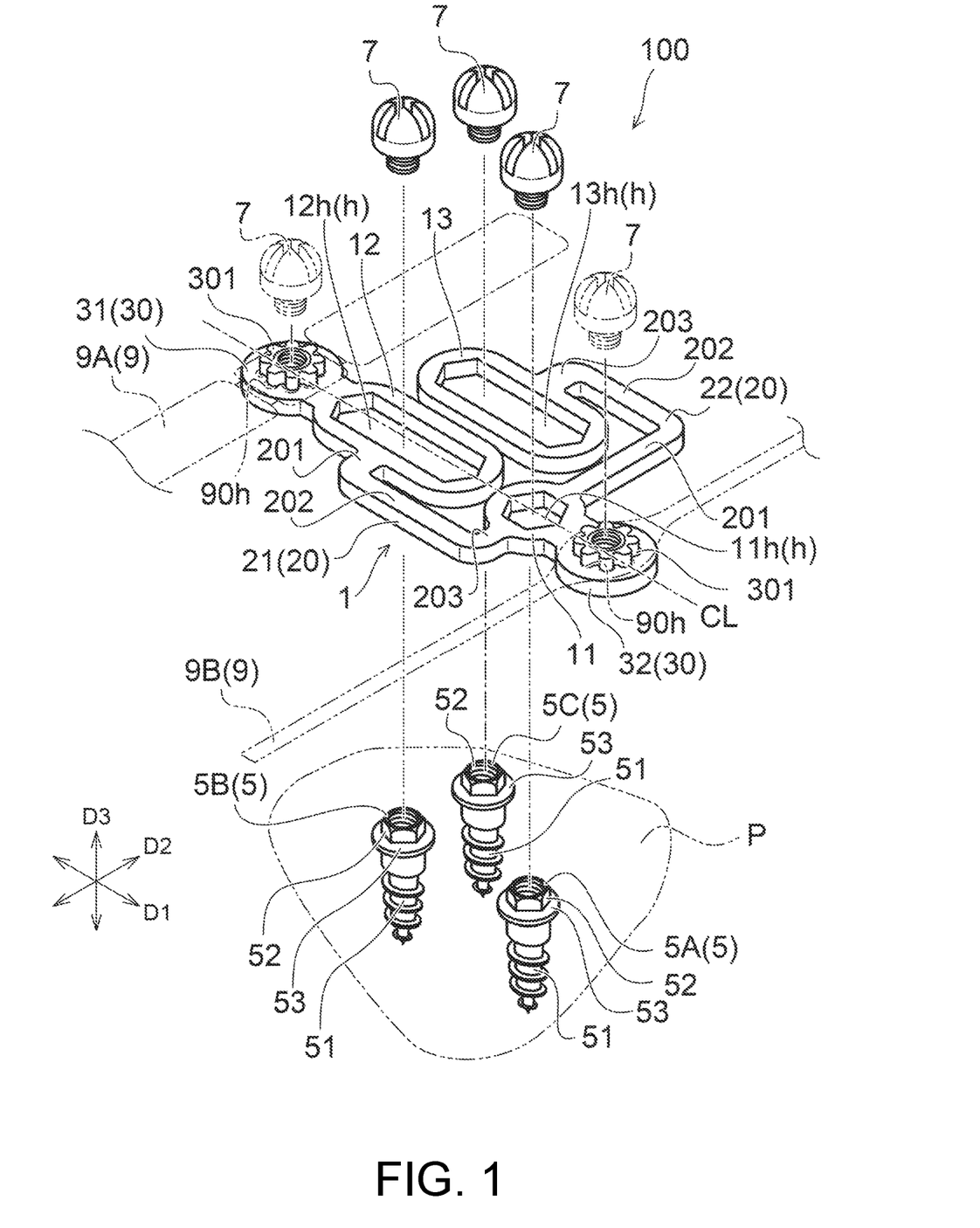
FIG. 1 is a perspective view illustrating, as an example, a configuration of a base member according to an embodiment.

FIG. 1 is a perspective view illustrating, as an example, a configuration of a base member according to an embodiment.

FIG. 1 illustrates an exploded perspective view of an implant device (structure) 100 along with a base member 1.

Figure 2:
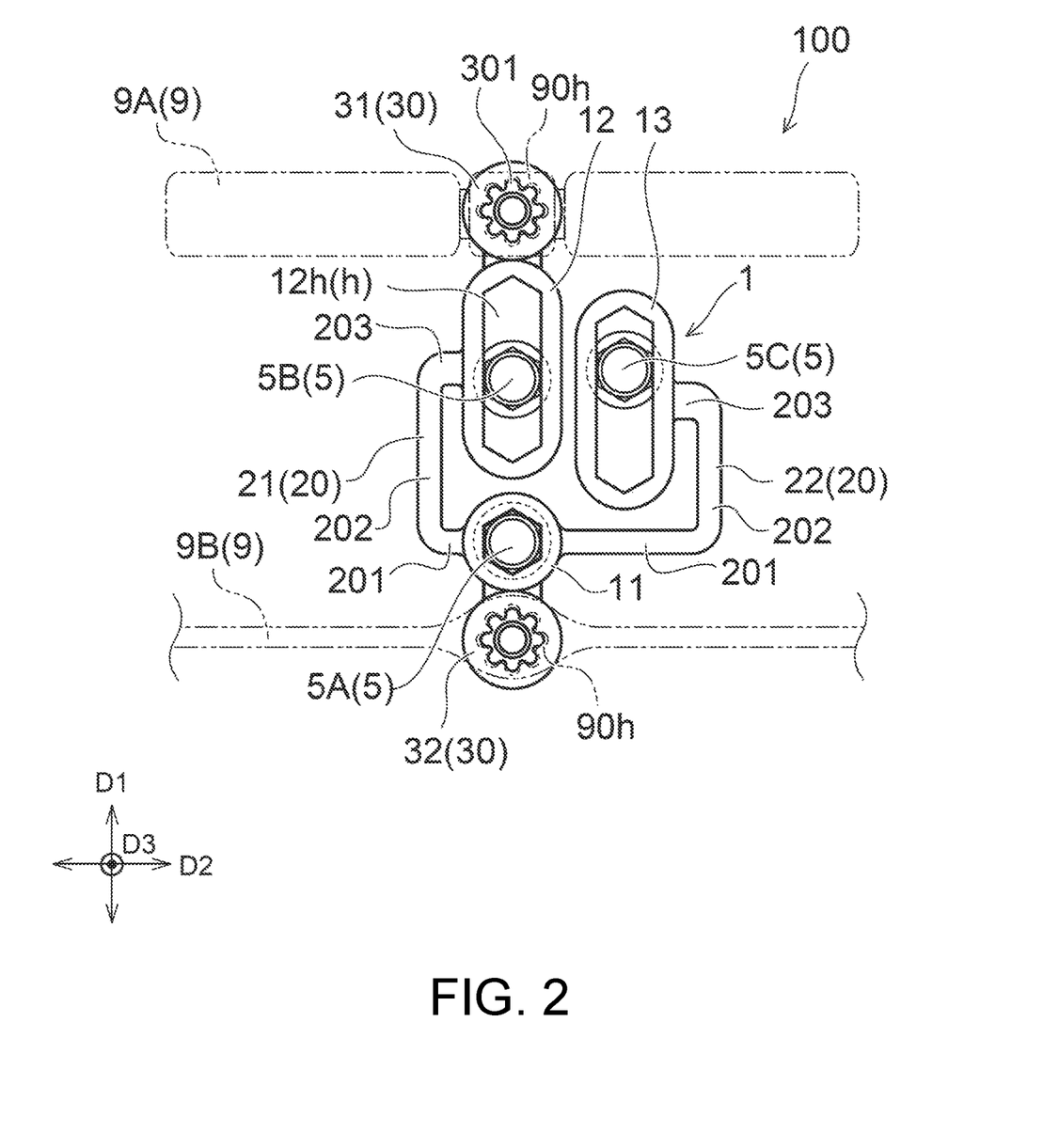
FIG. 2 is a plan view illustrating, as an example, a configuration of the base member according to the embodiment.

FIG. 2 is a plan view illustrating, as an example, a configuration of the base member according to the embodiment.

The orthodontic implant device 100 includes screws 5 that are embedded in a bone in an oral cavity P, a base member 1 that is secured to the screws 5, and an auxiliary tool 9 that is attached to the base member 1. The base member 1 according to the embodiment is used while being secured to the plurality of screws 5. The auxiliary tool 9 is appropriately selected in accordance with a correction method. For example, a plate-type auxiliary tool 9A or a wire-type auxiliary tool 9B is exemplified as the auxiliary tool 9.

Each screw 5 has a screw part 51 that is embedded in a bone in the oral cavity P and a polygonal-columnar head part 52 that is exposed inside the oral cavity P. The screw part 51 has, for example, a screw shape and is adapted to be able to be embedded in the bone. A material with excellent biocompatibility such as titanium-base materials including pure titanium and titanium alloys and stainless alloys, for example, is used as a material for the screws 5.

The outer shape of the polygonal-columnar head part 52 has a regular polygonal columnar shape (for example, a hexagonal prism shape). A female screw is provided at the center of the polygonal-columnar head part 52 such that a bolt 7, which will be described later, can be fastened thereto. A flange part 53 is provided between the screw part 51 and the polygonal-columnar head part 52. When each screw 5 is embedded in a bone in the oral cavity P, the screw 5 is embedded up to a position at which the lower surface of the flange part 53 abuts on the surface of the oral cavity P.

In the embodiment, at least three screws 5 are embedded in the bone in the oral cavity P. The at least three screws 5 include a first screw 5A, a second screw 5B, and a third screw 5C. In the following description, the first screw 5A, the second screw 5B, and the third screw 5C will be referred to as screws 5 in a case in which they are not distinguished from each other.

The base member 1 is secured to the plurality of screws 5. Similarly to the screws 5, a material with excellent biocompatibility such as titanium-based materials such as pure titanium and titanium alloys and stainless alloys, for example, is used as a material for the base member 1. At least three engagement holes h are provided in the base member 1. The engagement holes h are provided so as to be capable of engaging the polygonal-columnar head parts 52 of the screws 5. The aperture shape of the engagement holes h may be any shape as long as it is possible to prevent the polygonal-columnar head parts 52 from rotating when the polygonal-columnar head parts 52 are fitted. For example, the aperture shape may be a regular polygonal shape (a hexagonal shape, for example) corresponding to the outer shape of the polygonal-columnar head parts 52 or a long hole with an interval that is substantially equal to a pair of mutually parallel sides of the outer shape of the polygonal-columnar head part 52. At least three engagement holes h are arranged such that the respective centers thereof are not aligned in the same straight line.

In the embodiment, the base member 1 has a first base part 11, a second base part 12, and a third base part 13. The first base part 11 has a first engagement hole 11h that is provided so as to be capable of engaging the polygonal-columnar head part 52 of the first screw 5A. The second base part 12 has a second engagement hole 12h that is provided so as to be capable of engaging the polygonal-columnar head part 52 of the second screw 5B. The third base part 13 has a third engagement hole 13h that is provided so as to be capable of engaging the polygonal-columnar head part 52 of the third screw 5C. In the following description, the first engagement hole 11h, the second engagement hole 12h, and the third engagement hole 13h will be referred to as engagement holes h in a case in which they are not distinguished from each other.

Here, a straight line connecting the center of the first engagement hole 11h and the center of the second engagement hole 12h will be referred to as a straight line CL. The center of the third engagement hole 13h is not arranged on the straight line CL. That is, the three points, namely the center of the first engagement hole 11h, the center of the second engagement hole 12h, and the center of the third engagement hole 13h are included in the same plane.

In the embodiment, the direction along the straight line CL will be referred to as a first direction D1, the direction that perpendicularly intersects the first direction D1 will be referred to as a second direction D2, and a direction that perpendicularly intersects the first direction D1 and the second direction D2 will be referred to as a third direction D3.

At least one of the plurality of engagement holes h in the base member 1 is a long hole. In the base member 1 according to the embodiment, the second engagement hole 12h and the third engagement hole 13h are long holes that extend in the first direction D1. The aperture shape of the first engagement hole 11h is a regular hexagonal shape.

Bolts 7 are used to secure the base member 1 to the screws 5. That is, each of the polygonal-columnar head parts 52 of the plurality of screws 5 is fitted into each of the engagement holes h of the base member 1, and the bolts 7 are fastened to the female screws provided at the centers of the polygonal-columnar head parts 52. In this manner, the base member 1 is sandwiched between the flange parts 53 of the screws 5 and the bolts 7.

Even if variations occur in the positions of the screws 5 embedded in the bone inside the oral cavity P at this time, the engagement holes h that are formed as long holes make it possible to attach the base member 1 while absorbing the variations with the long holes. Also, since the rotation of the polygonal-columnar head parts 52 is prevented if the polygonal-columnar head parts 52 of the screws 5 are fitted into the engagement holes h, it is possible to perform fastening merely by rotating the bolts 7 without any need to maintain pressing on the screws 5.

In the base member 1, a coupling part 20 with flexibility is provided between at least either the first base part 11 and the second base part 12 or the first base part 11 and the third base part 13. In the embodiment, a first coupling part 21 is provided between the first base part 11 and the second base part 12, and a second coupling part 22 is provided between the first base part 11 and the third base part 13. In the following description, the first coupling part 21 and the second coupling part 22 will be referred to as coupling parts 20 in a case in which they are not distinguished from each other.

The coupling parts 20 are more easily bent than the first base part 11, the second base part 12, and the third base part 13 due to flexibility thereof. In order to cause such bending, the coupling parts 20 are provided in a predetermined routing shape. Therefore, a gap is provided between the two base parts coupled with the coupling part 20 such that the base parts are not connected directly (at the shortest distance).

Specifically, each coupling part 20 has a first arm part 201, a second arm part 202, and a third arm part 203. The first arm part 201 extends in the second direction D2, and the second arm part 202 extends in the first direction D1. The third arm part 203 extends on a side on which the first arm part 201 is connected to the second arm part 202. Each coupling part 20 is bent in a substantially U shape when seen in the third direction D3 due to the first arm part 201, the second arm part 202, and the third arm part 203.

In the first coupling part 21, the first arm part 201 extends in the second direction D2 from a side surface of the first base part 11, and the second arm part 202 extends in the first direction D1 from the tip end of the first arm part 201. Also, the third arm part 203 extends in the second direction D2 from the tip end of the second arm part 202 and is connected to a side surface of the second base part 12.

In the second coupling part 22, the first arm part 201 extends in the second direction D2 from the side surface on the side opposite to the first coupling part 21 of the first base part 11, and the second arm part 202 extends in the first direction D1 from the tip end of the first arm part 201. Also, the third arm part 203 extends in the second direction D2 from the tip end of the second arm part 202 and is connected to a side surface of the third base part 13.

Elasticity (flexibility) is set by the width, the sectional shape, the material, and the like of the coupling parts 20. It is possible to adjust relative positional relationships between the first base part 11 and the second base part 12 and between the first base part 11 and the third base part 13 with the flexibility of the first coupling part 21 and the second coupling part 22. Also, adjusting the rotation angle of the second base part 12 relative to the first base part 11 and the rotation angle of the third base part 13 relative to the first base part 11 may be facilitated due to routing and elasticity of the first arm part 201, the second arm part 202, and the third arm part 203. The adjustment of the positional relationships and the rotation angles will be described later.

Attachment of Auxiliary Tool

The auxiliary tool 9 is attached to the securing part 30 provided in the base member 1. A first securing part 31 and a second securing part 32 are provided in the base member 1 according to the embodiment. In the following description, the first securing part 31 and the second securing part 32 will be referred to as securing parts 30 in a case in which they are not distinguished from each other. The first securing part 31 is provided outward from the first base part 11, and the second securing part 32 is provided outward from the second base part 12.

The securing part 30 has a projecting part 301 that projects in the third direction D3. Irregularity is formed in an outer periphery of the projecting part 301. The pitch of the projecting or recessed parts of the irregularity is constantly provided. In the embodiment, the projecting or recessed parts are formed at an interval of 45 degrees with respect to the center of the projecting part 301. Also, a female screw is provided at the center of the projecting part 301.

A hole 90h corresponding to the outer shape of the projecting part 301 is provided at the auxiliary tool 9. Irregularity corresponding to the irregularity in the outer periphery of the projecting part 301 is formed in an inner periphery of the hole 90h. Therefore, the attachment angle of the auxiliary tool 9 with respect to the base member 1 is secured by fitting the hole 90h onto the projecting part 301 such that the irregularities are meshed against one another. The attachment angle of the auxiliary tool 9 can be changed in units of the pitch of the irregularity (45 degrees in the embodiment).

The bolt 7 is fastened into the female screw of the projecting part 301 in a state in which the hole 90h is fitted onto the projecting part 301. In this manner, the auxiliary tool 9 is sandwiched and secured between the bolt 7 and the securing part 30.

In the base member 1 according to the embodiment, the first securing part 31 is connected to the first base part 11, and the second securing part 32 is connected to the second base part 12. It is possible to select a necessary auxiliary tool 9 in accordance with a correction method and thereby to secure the auxiliary tool 9 to the first securing part 31 and the second securing part 32 at desired angles. Note that the shape of the securing part 30 is not limited to the aforementioned shape. The shape of the securing part 30 may be any structure with which it is possible to detachably secure the auxiliary tool 9 such that the auxiliary tool 9 does not rotate.

Attachment of Implant Device

Figure 3:
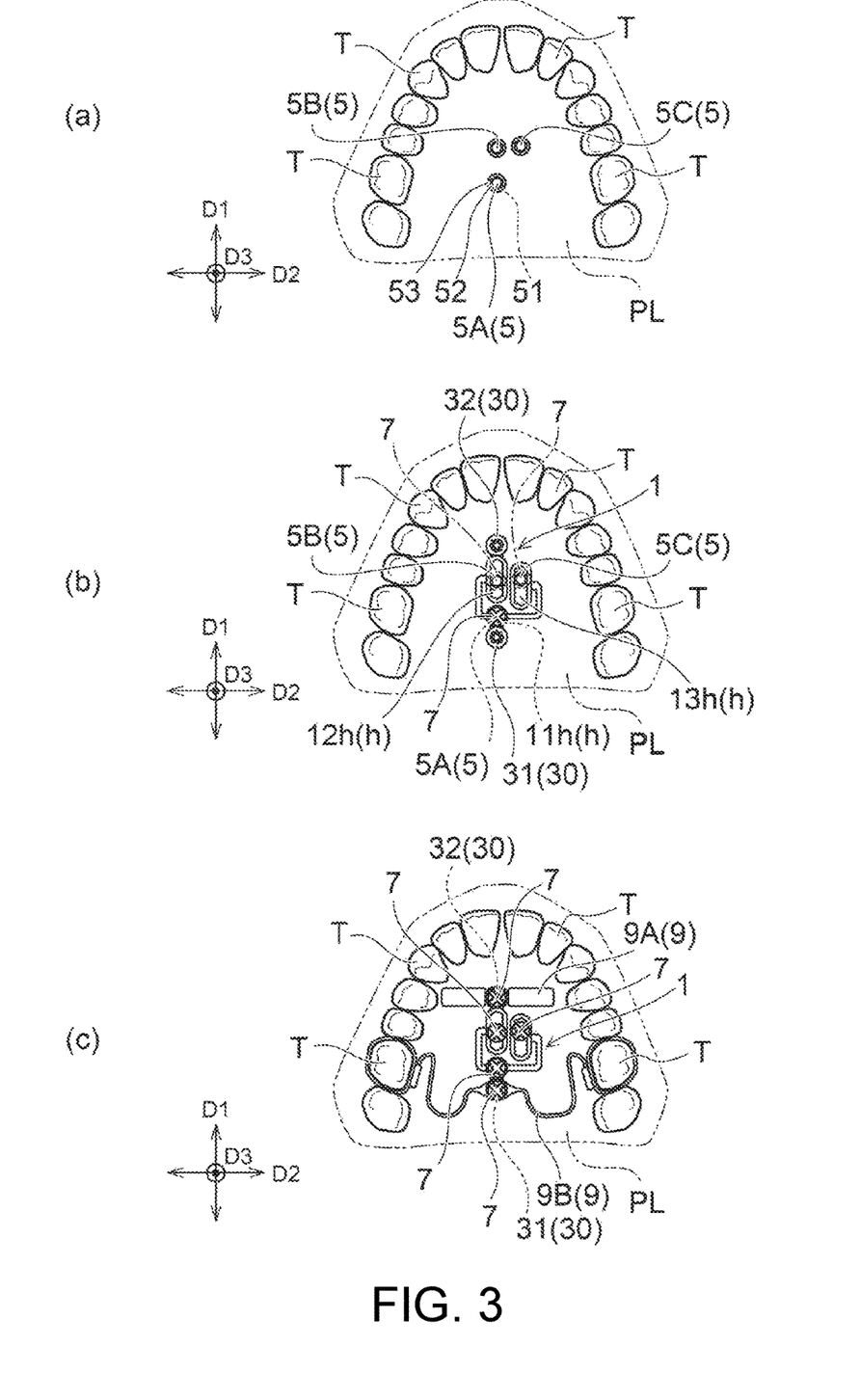
FIG. 3 in which (a) to (c) are schematic views for explaining attachment of an implant device.

FIG. 3 in which (a) to (c) are schematic views for explaining attachment of the implant device.

FIG. 3 illustrates an example in which the implant device 100 is attached to a hard palate PL.

First, the three screws 5 are embedded in the hard palate PL as illustrated in (a) of FIG. 3. The screw parts 51 of the screws 5 are embedded in a bone (upper jawbone) of the hard palate PL. The screws 5 are embedded up to a position at which the lower surfaces of the flange parts 53 are in contact with a plate mucosa of the hard palate PL. A state in which the polygonal-columnar head parts 52 of the screws 5 are exposed to the hard palate PL is achieved.

In the embodiment, the first screw 5A and the second screw 5B are embedded at a predetermined interval in a forward/backward direction of the hard palate PL, and the third screw 5C is embedded at a position that is slightly distant away from the first screw 5A and the second screw 5B in the left-right direction. The embedded positions of the first screw 5A, the second screw 5B, and the third screw 5C are positions that substantially correspond to the positions of the first engagement hole 11h, the second engagement hole 12h, and the third engagement hole 13h of the base member 1.

Next, the base member 1 is attached to the three screws 5 embedded in the hard palate PL as illustrated in (b) of FIG. 3. That is, the polygonal-columnar head part 52 of the first screw 5A is fitted into the first engagement hole 11h of the first base part 11, the polygonal-columnar head part 52 of the second screw 5B is fitted into the second engagement hole 12h of the second base part 12, and a polygonal-columnar head part 52 of the third screw 5C is fitted into the third engagement hole 13h of the third base part 13.

Even if the positional relationships between the three screws 5 and the respective engagement holes h slightly deviate from each other, it is possible to absorb the positional deviation and to realize the fitting by the engagement holes h being formed as long holes. Also, even if directions of the positional deviation differ from the directions of the long holes, it is possible to fit the hole positions by bending the coupling parts 20.

After the base member 1 is attached to the three screws 5, the bolts 7 are fastened to the polygonal-columnar head parts 52 of the respective screws 5. In this manner, the base member 1 is reliably secured to the three screws 5. In the embodiment, the base member 1 can be stably secured through three-point support since the base member 1 is secured with at least three screws 5 that are not aligned in a straight line. Also, it is possible to appropriately reduce degrees of freedom in deformation of the first arm part 201, the second arm part 202, and the third arm part 203 that have flexibility to such an extent to which it is possible to secure degrees of freedom in setting the relative positions of the first base part 11, the second base part 12, and the third base part 13 in a state before the securing with the screws 5, by securing the base member 1 with the three screws 5.

Next, the auxiliary tools 9 are secured to the securing parts 30 of the base member 1 as illustrated in (c) of FIG. 3. In the example illustrated in the drawing, the wire-type auxiliary tool 9B is secured to the first securing part 31, and the plate-type auxiliary tool 9A is secured to the second securing part 32. Each auxiliary tool 9 is attached by fitting the projecting part 301 of the securing part 30 into the hole 90h. Also, the auxiliary tool 9 can be secured to the securing part 30 by fastening the bolt 7 to the projecting part 301.

A method of using the auxiliary tools 9 is not limited. For example, the wire-type auxiliary tool 9B is fastened to a band or a bracket attached to a tooth T. The wire-type auxiliary tool 9B may fix the relative positions of the tooth T and the base member 1 using a stainless alloy-based wire with high rigidity or may apply an optimal force to the tooth T with reference (securing basis) to the base member 1 by adjusting a correction force (a tensile force or a pressing force) applied by the auxiliary tool 9B in a state in which a titanium alloy-based wire with high spring properties is used and appropriately bent.

It is possible to replace only the auxiliary tool 9 while the base member 1 is secured using the base member 1 according to the embodiment. That is, since the auxiliary tools 9 are secured to the securing part 30 with the bolts 7, it is possible to remove only the auxiliary tools 9 while the base member 1 is left, by removing the bolts 7. In a case in which it is desired to use different types of auxiliary tools 9 depending on a correction method and how the correction has proceeded, it is not necessary to replace the base member 1, and it is only necessary to replace the auxiliary tools 9. In this manner, it is possible to apply various correction forces to the tooth T through selection and adjustment of only the auxiliary tools 9. According to the embodiment, it is possible to replace the auxiliary tools 9 with neither rearrangement of the screws 5 nor attachment of the base member 1, and an excessive load is not imparted on the patient in the process of the correction. Also, it is possible to significantly reduce time and effort for the treatment provided by the doctor. Here, while it is necessary to remove the base member 1 together when the auxiliary tools 9 are removed in a case in which the base member 1 and the auxiliary tools 9 are integrated, this operation may degrade a fastening force of the screws 5 embedded in the hard palate PL. Therefore, the probability that the base member 1 falls off from the hard palate PL increases if the number of times the auxiliary tools 9 are replaced increases. According to the embodiment, it is possible to detach only the auxiliary tools 9 while leaving the base member 1 and to reduce a risk of the falling-off of the base member 1 due to a decrease in the fastening force of the screws 5 as described above.

Also, the base member 1 is fixedly secured with at least three screws 5 that are not aligned on a straight line. Therefore, it is possible to effectively prevent loosening of the base member 1 and the screws 5 from occurring even in a case in which a correction force is applied via the auxiliary tools 9. Since the base member is typically secured with two screws, the base member may move if a force is applied in a direction other than the direction in which the two screws are aligned or in the rotation direction. Motion, vibration, and the like of the base member may induce loosening of the screws. The base member 1 does not move regardless of a direction in which the correction force is applied, by at least three screws 5 that are not aligned on a straight line securing the base member 1 as in the embodiment. In this manner, it is also possible to prevent the screws 5 from loosening.

Also, since the base member 1 can be fixedly secured, a degree of freedom in design regarding arrangement of the securing parts 30 to which the auxiliary tools 9 are attached increases. If the securing parts 30 are arranged outside beyond the securing positions with the screws 5 as in the base member 1 according to the embodiment, a large rotational moment around the screws 5 at centers tends to be applied. In particular, a larger rotational moment is applied to the screws 5 as the auxiliary tools 9 are longer. Therefore, in a case in which the base member is secured with two screws, the securing parts are arranged between the two screws (near the center of the base member, for example) in many cases.

However, if the base member 1 is secured with at least three screws 5 that are not aligned on a straight line as in the embodiment, it is possible to effectively cause the rotational moment applied to one screw 5 to be dispersed. Therefore, it is possible to prevent the base member 1 and the screws 5 from loosening even if the securing parts 30 are arranged at the tip end (outside beyond the screws 5) of the base member 1. Therefore, a degree of freedom in designing a layout of the securing parts 30 according to the embodiment increases.

Positional Relationship and Rotation Angle of Base Part

Figure 4:
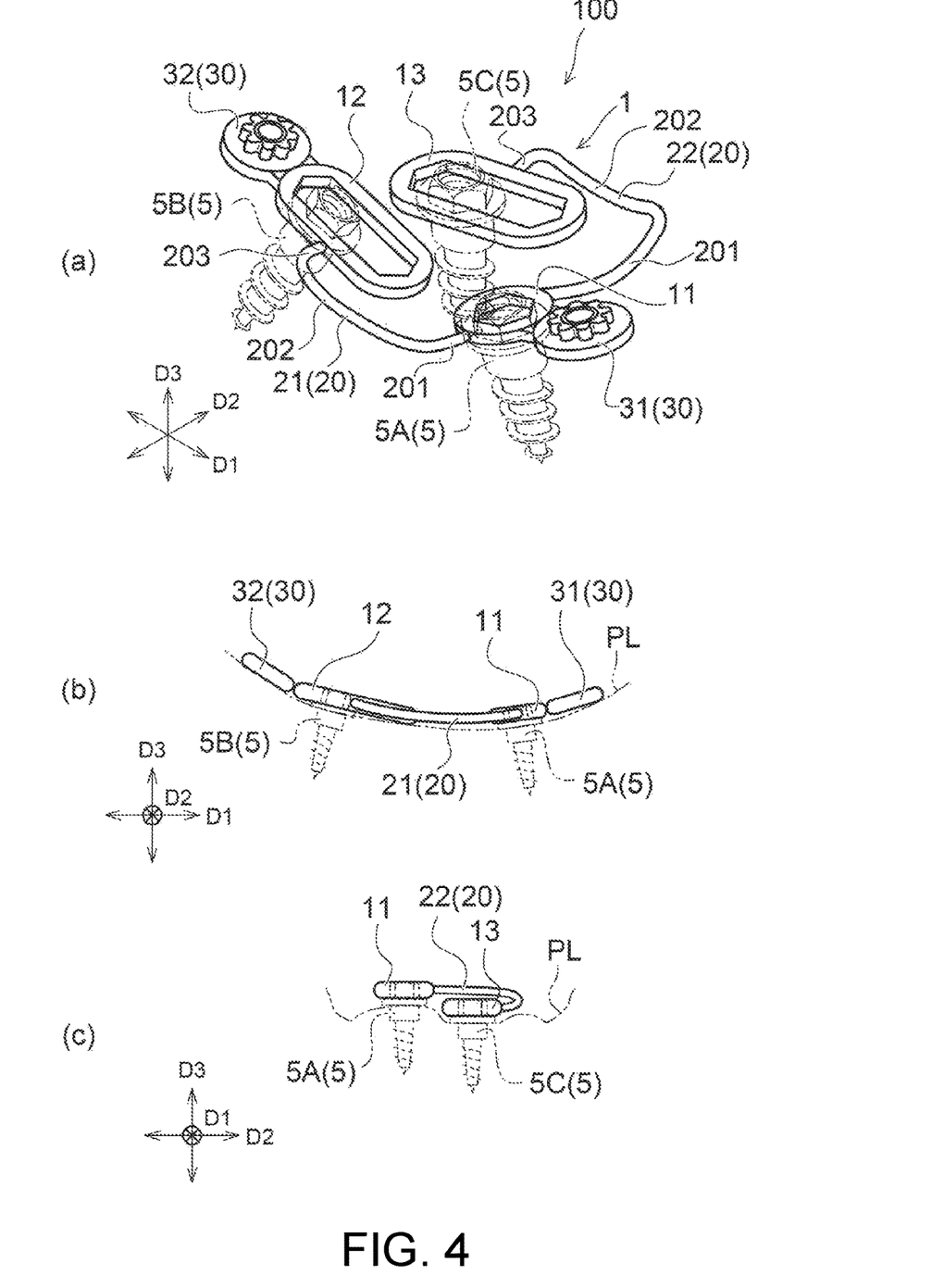
FIG. 4 in which (a) to (c) are schematic views for explaining a positional relationship and rotation angles of base parts.

FIG. 4 in which (a) to (c) are schematic diagrams for explaining a positional relationship and a rotation angle of the base part.

(a) of FIG. 4 illustrates a perspective view of the base member 1, (b) of FIG. 4 illustrates a diagram of the base member 1 when seen in the second direction D2, and (c) of FIG. 4 illustrates a diagram of the base member 1 when seen in the first direction D1.

In the base member 1 according to the embodiment, the first coupling part 21 is provided between the first base part 11 and the second base part 12, and the second coupling part 22 is provided between the first base part 11 and the third base part 13. Degrees of freedom in the positional relationship and the rotation angles of the first base part 11 and the second base part 12 increase due to elasticity of the first coupling part 21. Also, degrees of freedom in the positional relationship and the rotation angles of the first base part 11 and the third base part 13 increases due to elasticity of the second coupling part 22.

Each of the first arm part 201, the second arm part 202, and the third arm part 203 that forms each coupling part 20 is bent in a direction that perpendicularly intersects the arm extending direction and is twisted in the rotation direction around the arm at the center. That is, each arm part of the coupling part 20 has a degree of freedom in three axes with reference to one end. According to the base member 1 of the embodiment, the coupling parts 20 cause the respective base parts to have degrees of freedom in the positional relationships and the rotation angles and can realize accurate attachment in accordance with various shapes of the oral cavity P.

For example, the hard palate PL in the oral cavity P is three-dimensionally bent and has a complicated irregular shape. The shape differs depending on each patient. In a case in which the base member 1 is secured in the oral cavity P with such a complicated shape, it is possible to bend each base part with the coupling parts 20 and thereby to fit the respective base parts to the screws 5 in accordance with positional deviations and embedded angles of the screws 5.

As illustrated in (b) of FIG. 4, for example, it is possible to adjust the first base part 11 in a direction that perpendicularly intersects the axis of the first screw 5A and to adjust the second base part 12 in a direction that perpendicularly intersects the axis of the second screw 5B by causing the first coupling part 21 to be bent in a case in which the first screw 5A and the second screw 5B are mutually obliquely embedded in the bent hard palate PL.

Also, as illustrated in (c) of FIG. 4, for example, it is possible to adjust the respective positions and angles of the first base part 11 and the third base part 13 in accordance with the respective embedded directions of the first screw 5A and the third screw 5C by causing the second coupling part 22 to be bent or twisted even if the first screw 5A and the third screw 5C are embedded in a state in which mutual heights and angles differ from each other.

Note that although (b) of FIG. 4 illustrates a positional relationship between the first base part 11 and the second base part 12, and (c) of FIG. 4 illustrates a positional relationship between the first base part 11 and the third base part 13, the same applies to other positional relationships between the base parts.

In a case in which the base member 1 is secured with at least three screws 5 as in the embodiment, it becomes necessary to perform the attachment in accordance with a three-dimensional shape inside the oral cavity P. It is possible to reliably secure the base member 1 such that the positions and the angles of the first base part 11, the second base part 12, and the third base part 13 are caused to follow the complicated shape in the oral cavity P by utilizing the bending or the twisting of the coupling parts 20 as described above.

In addition, since no excessive force is applied to the respective screws 5 in a state in which the base member 1 is secured inside the oral cavity P using the bending or the twisting of the coupling parts 20, neither loosening of the screws 5 and the bolts 7 after the securing nor deviation of the base member 1 tends to occur. That is, it is possible to freely adjust the attachment in accordance with the shape inside the oral cavity P when the base member 1 is attached inside the oral cavity P and to reduce a burden of the treatment. Also, since the base member 1 is attached so as to follow (in close contact with) the shape of the oral cavity P after the securing, the loosening tends not to occur, and it is possible to reduce an unpleasant feeling of the attachment.

Note that narrowed parts or grooves (thin parts) may be provided at a part of the first securing part 31, which is connected to the first base part 11, and at a part of the second securing part 32, which is connected to the second base part 12. In this manner, it becomes easier to bend the first securing part 31 and the second securing part 32 relative to the base parts and to adjust the angles of the first securing part 31 and the second securing part 32 in accordance with the shape inside the oral cavity P.

Examples of Other Base Members

Figure 5:
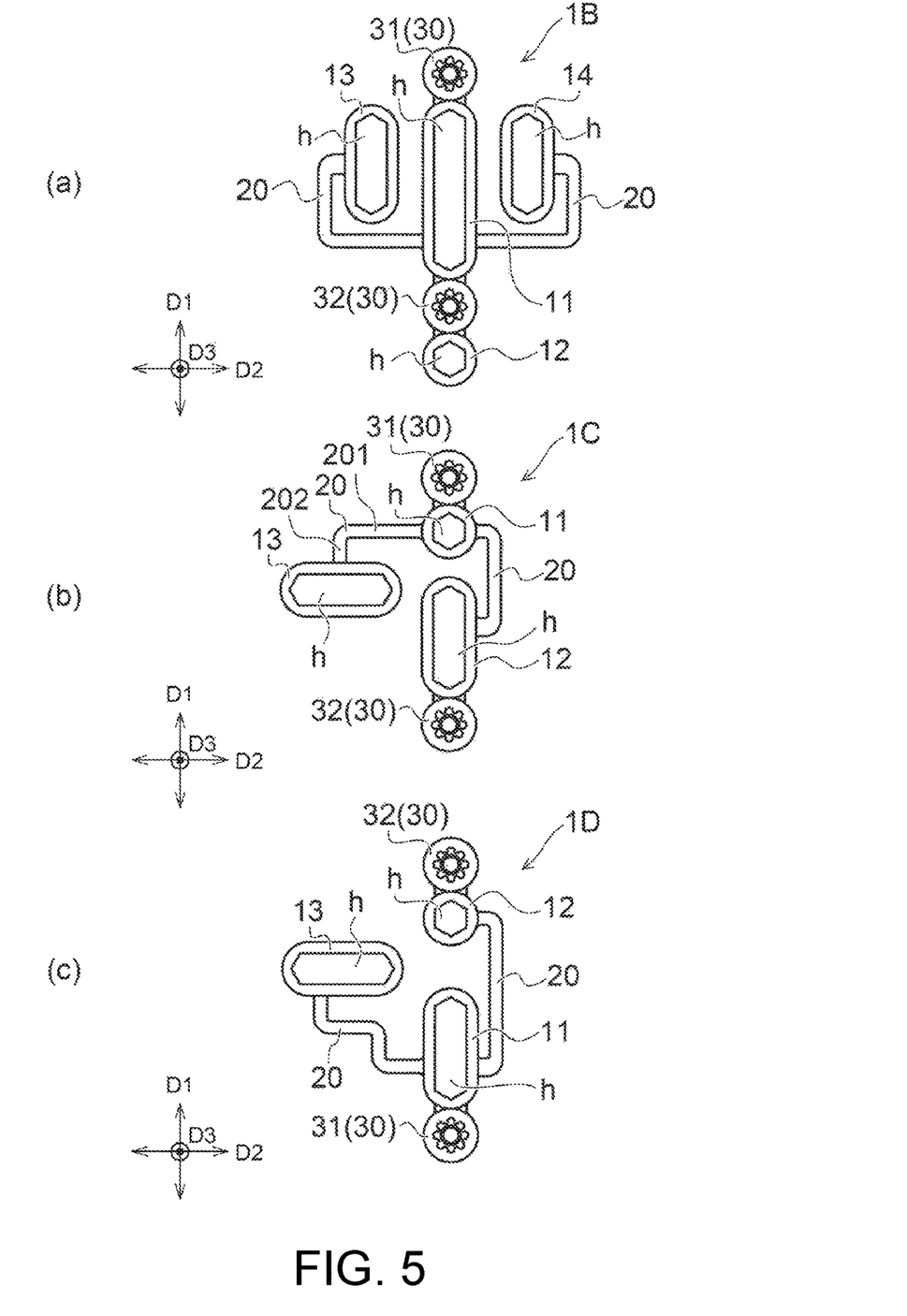
FIG. 5 in which (a) to (c) are schematic plan views illustrating examples of other base members.

FIG. 5 in which (a) to (c) are schematic plan views illustrating examples of other base members.

A base member 1B illustrated in (a) of FIG. 5 has a first base part 11, a second base part 12, a third base part 13, and a fourth base part 14. An engagement hole h is provided at each base part. The engagement holes h of the first base part 11, the third base part 13, and the fourth base part 14 are long holes that extend in the first direction D1. Also, the first securing part 31 is connected to the outside of the first base part 11, and the second securing part 32 is provided between the first base part 11 and the second base part 12. The coupling parts 20 are provided between the first base part 11 and the third base part 13 and between the first base part 11 and the fourth base part 14, respectively.

In the base member 1B, the third base part 13 is provided on one side of the first base part 11, and the fourth base part 14 is provided on the other side. The base member 1B is secured inside the oral cavity P by respectively securing each of the four screws 5 to each of the first base part 11, the second base part 12, the third base part 13, and the fourth base part 14. According to the base member 1B, it is possible to realize more fixed attachment than in a case in which the securing is achieved with three screws 5.

In addition, it becomes easier to disperse the correction force that is applied when the auxiliary tools 9 are secured to the screw 5 for securing the first base part 11 and the screw 5 for securing the second base part 12 since the second securing part 32 is provided between the first base part 11 and the second base part 12. Therefore, a configuration that is suitable for a case in which a stronger correction force is applied is achieved.

In a base member 1C illustrated in (b) of FIG. 5, the direction in which the third base part 13 extends corresponds to the second direction D2. In accordance with this, the engagement hole h provided in the third base part 13 is a long hole that extends in the second direction D2. In this manner, it is possible to increase a degree of an attachment margin of the base member 1C in a case in which the position of the screw 5 for securing the third base part 13 deviates in the second direction D2.

Also, the coupling part 20 provided between the first base part 11 and the third base part 13 has a first arm part 201 that extends in the second direction D2 and a second arm part 202 that extends in the first direction D1, and the length of the first arm part 201 is longer than that of the second arm part 202. That is, the coupling part 20 is provided in a substantially L shape when seen in the third direction D3. In this manner, the third base part 13 easily moves in the first direction D1 and the third direction D3. There is also a case in which it is desired to move the position of the third base part 13 in the first direction D1 and the third direction D3 to a higher degree depending on the shape inside the oral cavity P. In this case, the base member 1C is effectively used. Note that the degree of freedom in the attachment position of the screw 5 (5C) in the second direction D2 is secured by the engagement hole h of the third base part 13 having a shape that is long in the second direction D2.

In a base member 1D illustrated in (c) of FIG. 5, the coupling part 20 provided between the first base part 11 and the third base part 13 has four arm parts. The four arm parts extend in a stepwise manner. For example, the four arm parts extend in an order of the second direction D2, the first direction D1, the second direction D2, and the first direction D1 from the first base part 11 toward the third base part 13. In this manner, it is possible to increase movable axes of the third base part 13 as compared with a configuration in which two and three arm parts extend.

According to the embodiment, it is possible to provide the base members 1, 1B, 1C, and 1D in an orthodontic implant device 100 which makes it possible to easily and reliably attach a correction implement as described above.

Note that although the embodiments and specific examples thereof have been described above, the invention is not limited to these examples. For example, it is only necessary to set the relative positions of at least three engagement holes in such an arrangement that the three screws 5 inserted into and secured to at least three engagement holes are not aligned on the same straight line in a top view even if the centers of at least three engagement holes are aligned on the same straight line. Also, the shape and the number of the base parts, the routing shape of the coupling parts 20, and the like other than those described above may be employed.

Although the securing parts 30 for securing the auxiliary tools 9 are sequentially provided at the base part in the aforementioned embodiments, the securing parts 30 may be sequentially provided at arm parts that connect the base parts. Also, although the arm parts have substantially the U shape and the lengths of the arm parts are long from the viewpoint of securing flexibility thereof in many cases, the invention is not limited thereto. The base parts may be linearly connected to each other, may have a substantially L shape, or may have a substantially crank shape. Although the engagement hole provided in each base part has a polygonal shape in a plan view, the invention is not limited thereto. For example, the engagement hole may have an elongated circular shape (a shape obtained by expanding a circle in one direction). Although the female screws are provided at the polygonal-columnar head parts of the screws 5, male screws may be provided. In this case, the base parts may be secured to the screws 5 using nuts instead of the bolts. Similarly, the female screw provided at the securing part 30 may be a male screw. In this case, the auxiliary tool 9 may also be secured to the securing parts 30 using nuts instead of the bolts. Although the irregularity is provided in the outer periphery of the projecting parts of the securing parts 30, the outer shape of the projecting parts may be arbitrarily selected. The projecting parts may have an octagonal shape or a hexagonal shape in a plan view.

Also, the aforementioned embodiments or specific examples to which those skilled in the art have appropriately made addition, deletion, and a change in design of components and appropriate combinations of features of the embodiments are also included in the scope of the invention as long as they include the gist of the invention.

The invention claimed is:

1. A base member used for an orthodontic implant device which includes and is secured by a plurality of screws that are adapted to be embedded in a bone in an oral cavity,
    wherein each of the plurality of screws has a screw part that is adapted to be embedded in the bone and a polygonal-columnar head part that is adapted to be exposed inside the oral cavity,
    the base member has at least three engagement holes provided so as to be capable of engaging each of the polygonal-columnar head part, and
    a relative position of the at least three engagement holes are set such that three of the screws inserted into and secured to the at least three engagement holes are not aligned on the same straight line in a top view, the plurality of screws has first, second, and third screws, and the base member has a first base part that has a first engagement hole that is provided so as to be capable of engaging the polygonal-columnar head part of the first screw, a second base part that has a second engagement hole that is provided so as to be capable of engaging the polygonal-columnar head part of the second screw, and a third base part that has a third engagement hole that is provided so as to be capable of engaging the polygonal-columnar head part of the third screw and such that the third engagement hole is not aligned on a straight line connecting a center of the first engagement hole to a center of the second engagement hole;

the base member further comprising:

a first coupling part with flexibility that is provided between the first base part and the third base part, wherein the first coupling part adjusts relative positional relationships between the first base part and the third base part, wherein the first coupling part has a first arm part that extends in one direction and a second arm part that is connected to the first arm part and extends in another direction that is different from the one direction, and each of the first arm part and the second arm part of the first coupling part has a degree of freedom in three axes with reference to one end.

2. The base member used for an orthodontic implant device according to claim 1, wherein the first coupling part further has a third arm part that is connected to the second arm part and extends on a side on which the first arm part is connected to the second arm part, and the third arm part has a degree of freedom in three axes with reference to a side end of the second arm part.

3. The base member used for an orthodontic implant device according to claim 2, further comprising:

a second coupling part with flexibility that is provided between the first base part and the second base part, wherein the second coupling part adjusts relative positional relationships between the first base part and the second base part.

4. The base member used for an orthodontic implant device according to claim 3, wherein the second coupling part has a first arm part that extends in one direction and a second arm part that is connected to the first arm part and extends in another direction that is different from the one direction, and each of the first arm part and the second arm part of the second coupling part has a degree of freedom in three axes with reference to one end.

5. The base member used for an orthodontic implant device according to claim 4, wherein the second coupling part further has a third arm part that is connected to the second arm part and extends on a side on which the first arm part is connected to the second arm part, and the third arm part of the second coupling part has a degree of freedom in three axes with reference to a side end of the second arm part of the second coupling part.

6. The base member used for an orthodontic implant device according to claim 2, wherein at least one of the first, second, and third engagement holes is a long hole.

7. The base member used for an orthodontic implant device according to claim 2, further comprising:

a securing part that is connected to at least any one of the first, second, and third base parts and detachably secures an auxiliary tool.

* * * * *